United States Patent
Takayama

(10) Patent No.: US 7,936,380 B2
(45) Date of Patent: May 3, 2011

(54) IMAGING APPARATUS HAVING GROUPS WITH DESIGNATED REPRESENTATIVE IMAGES

(75) Inventor: Nobutoshi Takayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 867 days.

(21) Appl. No.: 11/205,728

(22) Filed: Aug. 17, 2005

(65) Prior Publication Data

US 2006/0002701 A1    Jan. 5, 2006

Related U.S. Application Data

(62) Division of application No. 10/393,736, filed on Mar. 21, 2003, now Pat. No. 6,970,192.

(30) Foreign Application Priority Data

Apr. 5, 2002    (JP) ................................ 2002-103934

(51) Int. Cl.
*H04N 9/73* (2006.01)
(52) U.S. Cl. ................ 348/231.2; 348/333.05
(58) Field of Classification Search ............... 348/218.1, 348/231.2, 36, 222.1, 231.3, 333.05; 715/841, 715/838
See application file for complete search history.

(56) References Cited

U.S. PATENT DOCUMENTS

| | | | | |
|---|---|---|---|---|
| 5,903,309 A * | 5/1999 | Anderson | ................. | 348/333.02 |
| 6,061,695 A * | 5/2000 | Slivka et al. | ................. | 715/203 |
| 6,249,316 B1 * | 6/2001 | Anderson | ................. | 348/333.05 |
| 6,373,507 B1 * | 4/2002 | Camara et al. | ................. | 715/825 |
| 6,486,914 B1 * | 11/2002 | Anderson | ................. | 348/333.02 |
| 6,683,649 B1 * | 1/2004 | Anderson | ................. | 348/333.05 |
| 6,765,612 B1 * | 7/2004 | Anderson et al. | ................. | 348/231.2 |
| 6,829,624 B2 * | 12/2004 | Yoshida | ................. | 707/205 |
| 6,886,056 B2 * | 4/2005 | Ohmura | ................. | 710/62 |
| 6,920,466 B2 * | 7/2005 | Kudo | ................. | 707/200 |
| 7,130,864 B2 * | 10/2006 | Lin et al. | ................. | 1/1 |
| 7,145,695 B2 * | 12/2006 | Endo et al. | ................. | 358/2.1 |
| 7,269,335 B2 * | 9/2007 | Okamoto et al. | ................. | 386/95 |
| 7,337,403 B2 * | 2/2008 | Pavley et al. | ................. | 715/747 |

(Continued)

FOREIGN PATENT DOCUMENTS

JP    11-232440    8/1999

(Continued)

OTHER PUBLICATIONS

Microsoft TechNet, Chapter 12; Jun. 21, 2001, Microsoft Corporation, pp. 1-15.*

(Continued)

*Primary Examiner* — Jason Chan
*Assistant Examiner* — Gary C Vieaux
(74) *Attorney, Agent, or Firm* — Cowan, Liebowitz & Latman, P.C.

(57) ABSTRACT

An imaging apparatus for recording image data picked up by an image pickup unit until a recording medium is presented. In response to an instruction from an instruction operation unit capable of arbitrary instruction, a first image data picked up by the image pickup unit is allocated to the same group as a second image data photographed immediately before the first image data so as to allocate the first image data to the same group as the image data picked up immediately before the first image data. In addition, management information containing group information that shows image data within the group is generated.

24 Claims, 13 Drawing Sheets

| DATA BLOCK NAME | DATA CONTENTS |
|---|---|
| INFORMATION OF TABLE OF CONTENTS OF FILE | POSITION AND INFORMATION AMOUNT OF CONTENTS INFORMATION BLOCK |
| FILE MANAGEMENT INFORMATION | IMAGE FILE ID AND GROUP ID IN ORDER OF PHOTOGRAPHING |
| GROUP INFORMATION | GROUP ID AND INFORMATION OF KIND OF GROUP |
| INTRA-GROUP FILE INFORMATION 01 | IMAGE FILE IDS AND REPRESENTATIVE IMAGE FILE ID |
| INTRA-GROUP FILE INFORMATION 02 | IMAGE FILE IDS AND REPRESENTATIVE IMAGE FILE ID |

U.S. PATENT DOCUMENTS

2003/0169288 A1* 9/2003 Misawa ............ 345/719
2003/0174217 A1* 9/2003 Kito et al. ............ 348/231.2
2006/0098105 A1* 5/2006 Okisu et al. ............ 348/231.99

FOREIGN PATENT DOCUMENTS

| JP | 11-341405 | 12/1999 |
| JP | 2001-218156 | 8/2001 |
| JP | 2001-285779 | 10/2001 |
| JP | 2001-320610 | 11/2001 |
| JP | 2003339013 A * | 11/2003 |

OTHER PUBLICATIONS http://www.computing.net/answers/window-xp/folder-backgrounds/11052.html, Name: JPW, Dec. 30, 2001, p. 2.*
Window XP document; Webposting dated Jan. 31, 2002; pp. 0-201.*
"Windows XP Professional, image folder customization XP Screenshots"; based on Windows XP Professional Version 2, release date Dec. 31, 2001, no service pack updates conducted; screen shots 1-20 generated by Examiner via computer running this specific operating system.*

* cited by examiner

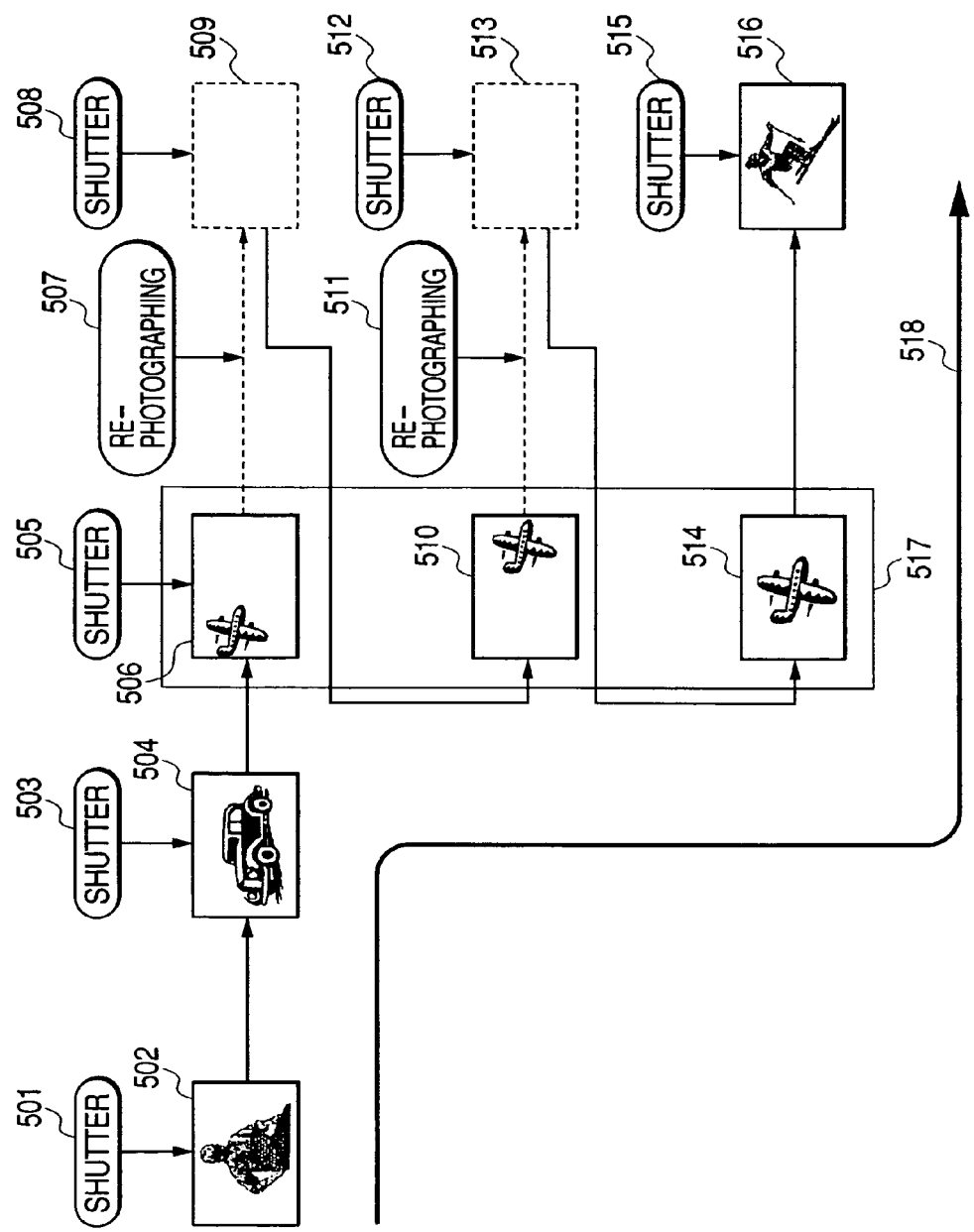

FIG. 6

| DATA BLOCK NAME | DATA CONTENTS |
|---|---|
| INFORMATION OF TABLE OF CONTENTS OF FILE | POSITION AND INFORMATION AMOUNT OF CONTENTS INFORMATION BLOCK |
| FILE MANAGEMENT INFORMATION | IMAGE FILE ID AND GROUP ID IN ORDER OF PHOTOGRAPHING |
| GROUP INFORMATION | GROUP ID AND INFORMATION OF KIND OF GROUP |
| INTRA-GROUP FILE INFORMATION 01 | IMAGE FILE IDS AND REPRESENTATIVE IMAGE FILE ID |
| INTRA-GROUP FILE INFORMATION 02 | IMAGE FILE IDS AND REPRESENTATIVE IMAGE FILE ID |

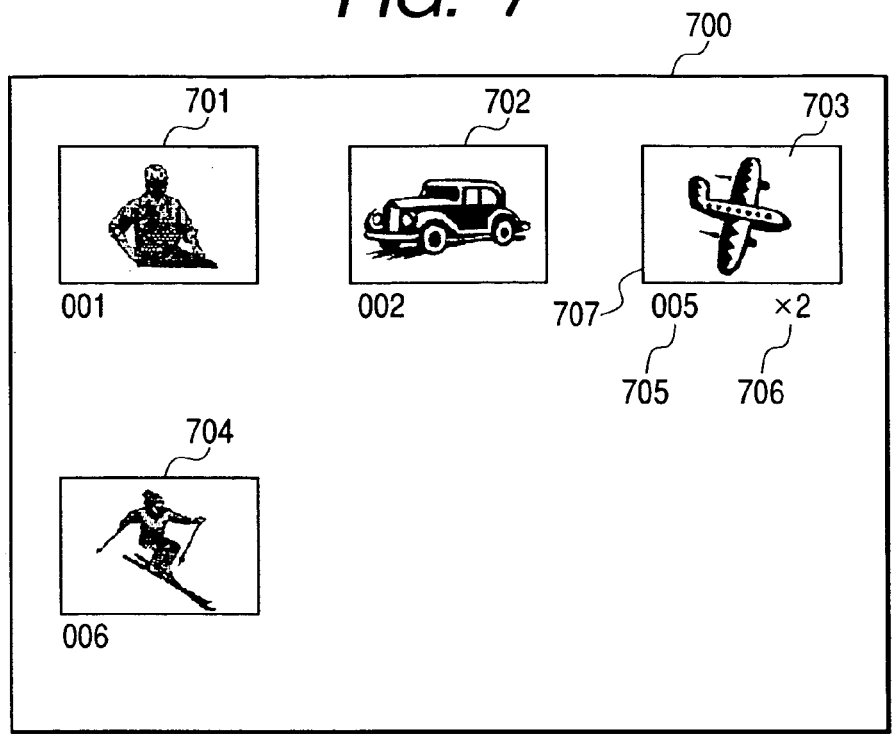
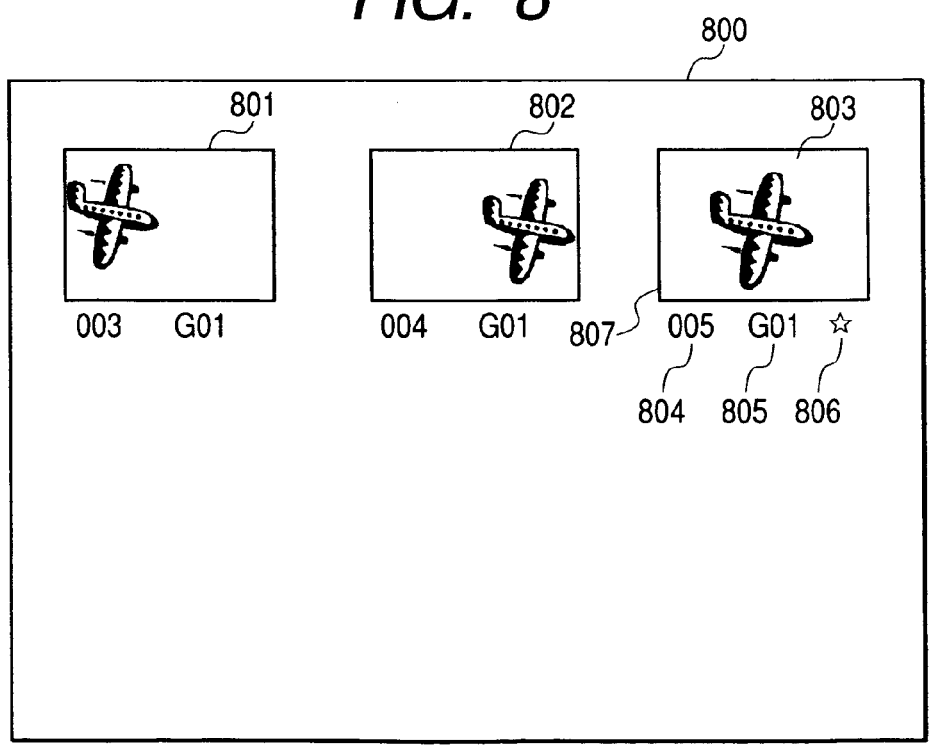

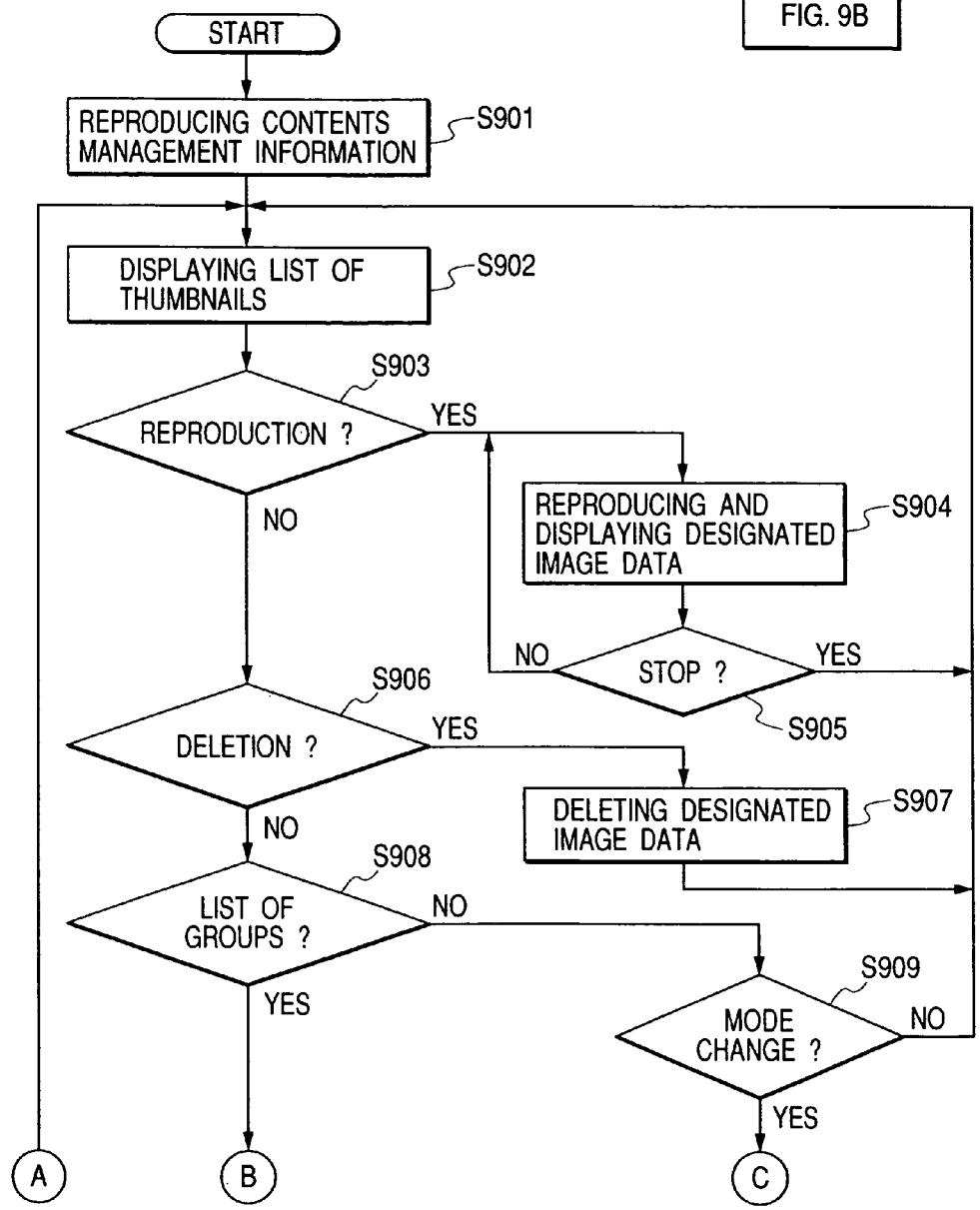

IMAGING APPARATUS HAVING GROUPS WITH DESIGNATED REPRESENTATIVE IMAGES

CROSS-REFERENCE TO RELATED APPLICATIONS

This application is a divisional of application Ser. No. 10/393,736, filed Mar. 21, 2003, now U.S. Pat. No. 6,970,192, the entire disclosure of which is hereby incorporated by reference.

BACKGROUND OF THE INVENTION

1. Field of the Invention

The present invention relates to an imaging apparatus, and more particularly to a process for grouping images that are photographed.

2. Related Background Art

Apparatuses for recording digital image data to, and reproducing the digital image data from, a memory card or an optical disk, such as digital cameras and digital disk recorders (hereinafter referred to as video cameras), are conventionally known. The storage capacity of each of the memory card and optical disk has increased dramatically in recent years, and it is possible with this type of video camera to record many image files on a storage medium such as the memory card or the optical disk.

For cases of performing photography, failures in framing, exposure, photography timing, and the like can be considered. If the video camera is provided with a large capacity memory card or optical disk, image taking is generally continued until a likable image is obtained.

In order to eliminate those types of photography failures, cameras have been devised which possess a function in which one frame image is taken into a temporary memory by depressing a shutter button halfway, and after this image is observed through a monitor, it is recorded in the memory card or the like when necessary, while recording to the memory card is prevented when unnecessary, or a function for displaying an image that has just been photographed, by a simple operation after image taking to decide whether the image should be deleted or not.

As stated above, it is necessary to find a desired image from among image data containing a large number of photographed images during reproduction, in case that the image data is recorded without deleting failed photography.

A function for lining up and displaying on the same screen a plurality of thumbnail images, in which the size of the image data recorded in the memory card is reduced, and searching for a desired image, is common in digital cameras at present. However, in case that a lot of images are thus recorded in the memory card as is, thumbnails of the failed images and thumbnails of the suitably photographed images are displayed in the same screen, this results in an extreme obstacle when searching for a desired image.

Dividing the image files into a plurality of groups based on the date of photography, the location of photography, and the like, and managing the image files per group can be considered.

However, if many image files are automatically grouped in accordance with date of photography, location of photography, and the like as stated above, the image files are not necessarily divided into groups intended by a user, and the convenience is poor.

On the other hand, with a method of storing the images into a temporary memory during photography, and then storing the images onto the memory card after their contents are checked, as discussed above, or with a method of determining whether or not to delete an image just photographed after confirmation, only those images that are desirable to the user can be recorded in the memory card. However, it is necessary for the user to verify on the spot whether or not a re-photographed image is truly a good image, and make an accurate judgement.

In addition, device miniaturization is advancing in recent-year digital cameras and the like, and there may be cases that checking up through detailed portions of an image on a small display liquid crystal monitor is difficult. Further, as to group pictures and the like, there are cases in which it is difficult to decide whether or not the photography desired has been accomplished, depending upon the subject.

Further, together with the increase in functionality of personal computers in recent years, image data photographed by digital cameras and the like is being loaded into personal computers, and retouching of the images is performed by using application software.

In order to generate a desired image by using a plurality of images in these circumstances, it is effective to also leave the failed images on the memory card and then use them. A method of saving the images including the failed images and retrieving them so as to be easily utilized when performing editing by personal computer later, is therefore preferable.

SUMMARY OF THE INVENTION

An object of the present invention is to solve those types of problems.

Another object of the present invention is to allow a user to easily manage a large number of image data files by using a simple operation.

In order to attain the above-mentioned objects, according to an aspect of the present invention, there is provided an imaging apparatus including:

image pickup means;

recording means for recording image data obtained by the image pickup unit onto a recording medium;

operation instructing means capable of arbitrary operations; and controlling means for allocating a first image data picked up by the image pickup means and a second image data picked up by the image pickup means immediately before the first image data, to a same group in accordance with an instruction from the operation instructing means, and for generating group information indicating the image data within the group.

Objects of the present invention other than those stated above, and their characteristics, become clear by the detailed explanation of the preferred embodiments of the present invention below, with reference to the drawings.

BRIEF DESCRIPTION OF THE DRAWINGS

FIG. 5 is a diagram showing states of user operation and photographed image during photography;

FIG. 6 is a diagram showing contents management information;

FIG. 7 is a diagram showing an entire list of thumbnails screen;

FIG. 8 is a diagram showing a list of thumbnails of the group screen;

DETAILED DESCRIPTION OF THE PREFERRED EMBODIMENTS

Preferred embodiments of the present invention are explained in detail below using the diagrams.

Figure 1:
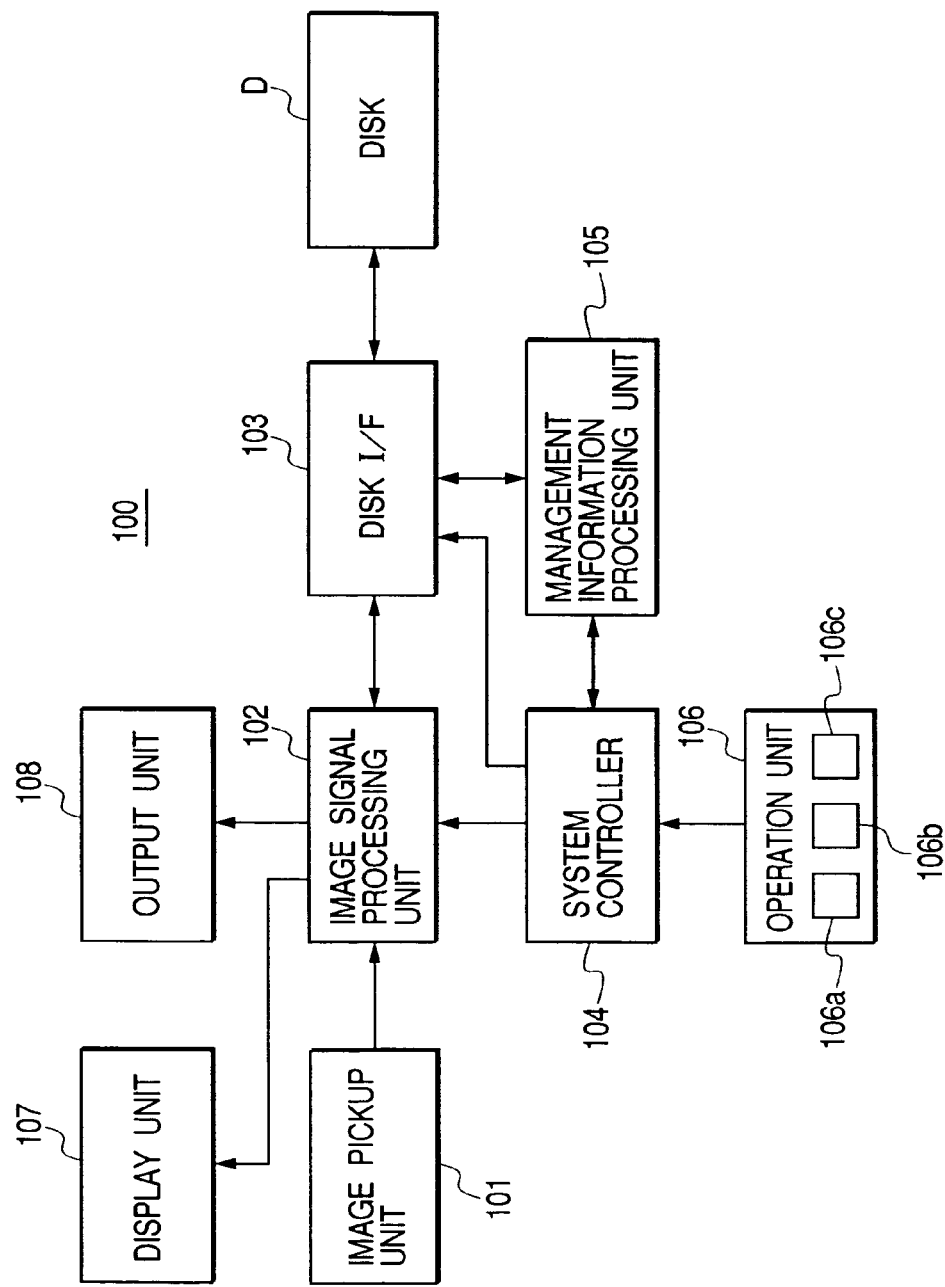
FIG. 1 is a diagram showing the structure of a video camera to which the present invention is applied.

FIG. 1 is a diagram showing the structure of a digital video camera recorder (hereinafter referred to as a video camera) to which the present invention is applied.

In FIG. 1, reference numeral 101 denotes an image pickup unit having a lens, a CCD, and the like, reference numeral 102 denotes an image signal processing unit for encoding an image signal from the image pickup unit 101, compressing the quantity of information in the encoded image signal, and decoding the reproduced image signal and expanding the quantity of information of the decoded image signal. Reference numeral 103 denotes a disk I/F for recording and reproducing image data and other data onto and from a disk D, the disk I/F having a known optical pickup or magnetic head, spindle motor, and the like. Reference numeral 104 denotes a system controller for controlling overall operations of the video camera 100, reference numeral 105 denotes a management information processing unit for processing group management information in order to manage groups among image files in accordance with this embodiment, and reference numeral 106 denotes an operation unit having a trigger key 106a, a re-photographing key 106b, a mode switch key 106c, and other operation keys. Reference numeral 107 denotes a display unit, and reference numeral 108 denotes an output unit for outputting image data obtained from the image pickup unit or reproduced image data to the outside.

Operation of the video camera of FIG. 1 during photography is explained next using the flowchart of FIGS. 2A and 2B.

Figures 2, 2A:
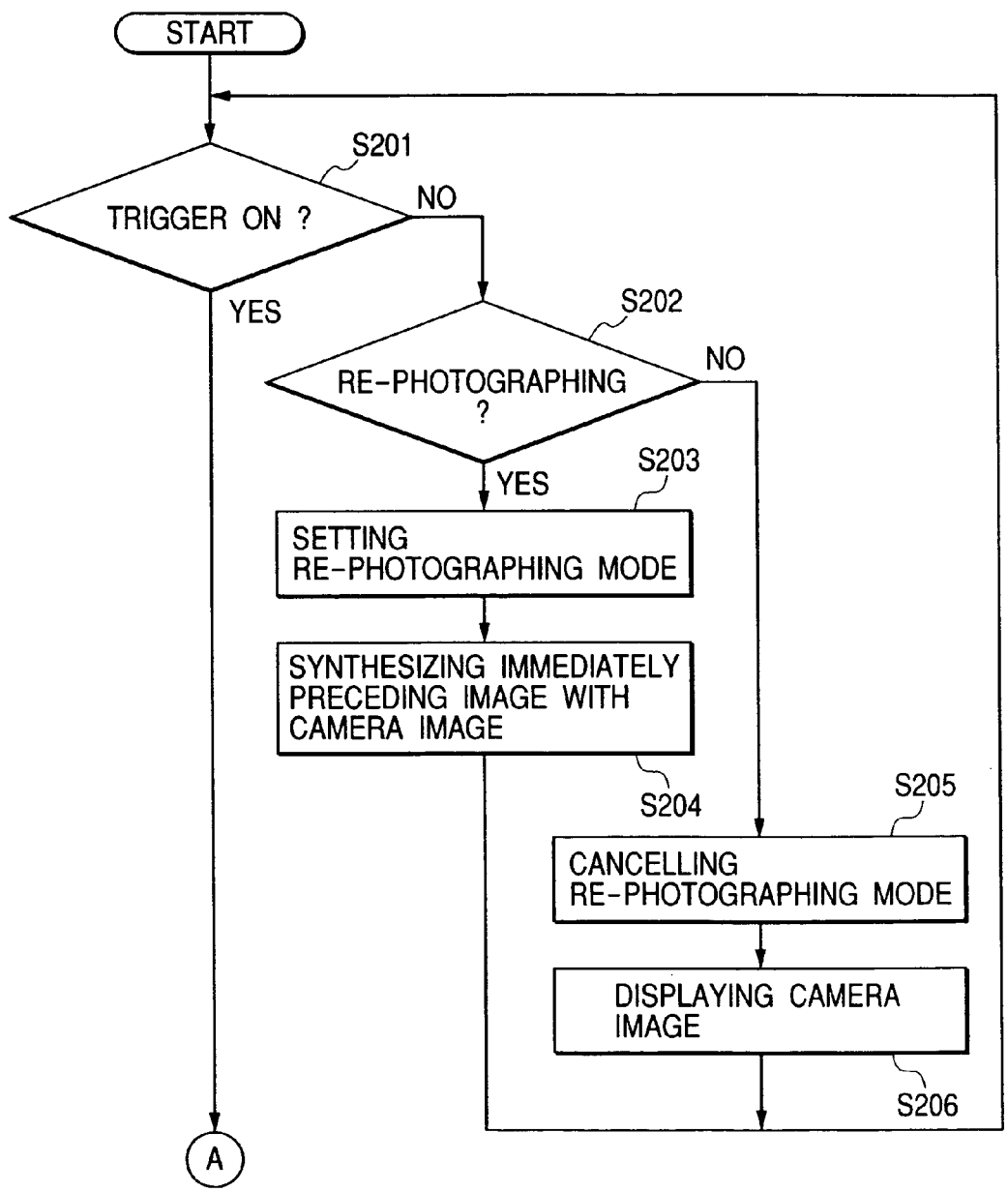
FIG. 2, composed of FIGS. 2A and 2B, is a flowchart showing operation during photography.
Figure 2B:
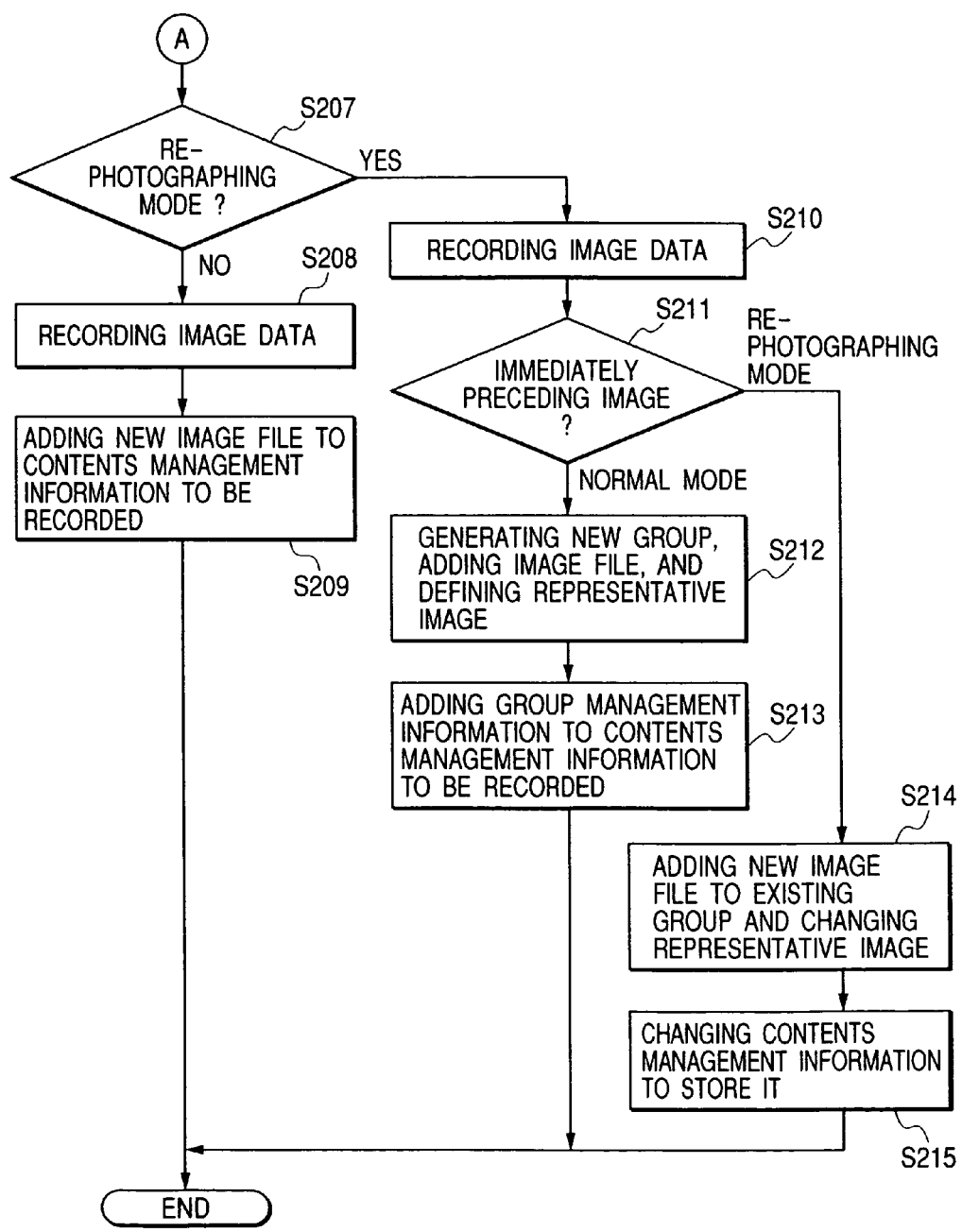

FIGS. 2A and 2B are flowcharts showing control by the system controller 104 in the photography mode. The flow of FIGS. 2A and 2B start when a user of FIG. 1 sets a camera mode by operating the mode switch key 106c.

In FIG. 2A, operation of the trigger key 106a is first confirmed in a step S201, and in case that the trigger key 106a is not operated, there is detected whether or not a re-photographing mode is set by the re-photographing key 106b in a step S202.

The image signal processing unit 102 is controlled so that, if the re-photographing mode is set, the system controller 104 sets the video camera mode to the re-photographing mode (a step S203), and further, makes a synthesis of a moving image obtained currently from the image pickup unit 101 and a still image photographed immediately before and stored in an internal memory of the image signal processing unit 102. The synthesized image is then displayed in the display unit 107 (a step S204).

Figure 3:
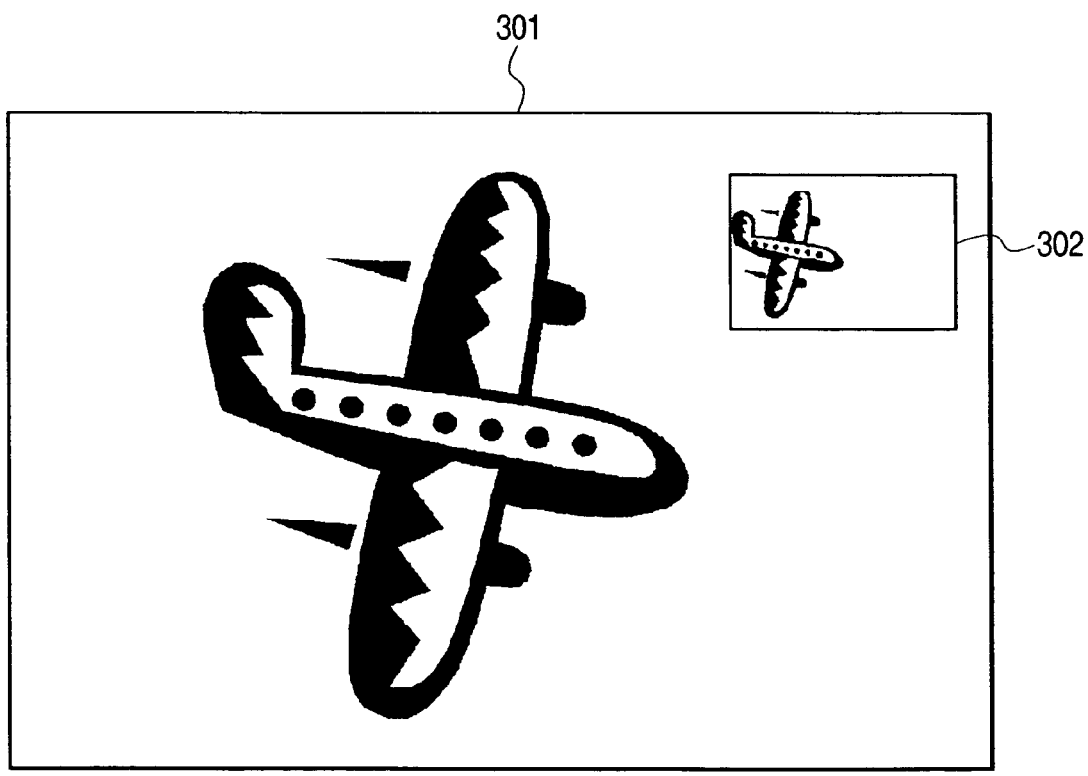
FIG. 3 is a diagram showing a display screen during a re-photographing mode.

The state of the image displayed in the display unit 107 at this point is shown in FIG. 3.

Reference numeral 301 of FIG. 3 denotes a display screen of the display unit 107, and an immediately-preceding still image 302 is synthesized and displayed in the display screen 301. By thus synthesizing and displaying the still image photographed immediately before, the user can understand that the re-photographing mode is set.

Note that an immediately preceding photographed image is not available immediately after turning on the electric power, nor in a state immediately after the mode is switched from the reproduction mode to the camera mode by using the mode switch key 106c. Setting the re-photographing mode by using the re-photographing key 106b is therefore made invalid, and this is displayed in the display unit 107.

On the other hand, in case that the re-photographing key 106b is not operated, the re-photographing mode is cancelled, and only an image from the image pickup unit 101 is displayed in the display unit 107.

Detection is made in a step S207 as to whether or not the re-photographing mode is set, if the trigger key 106a is operated in this condition.

The mode is judged to be a normal photography mode in case that the re-photographing mode is not set, and one frame of image data corresponding to an operation of the trigger key 106a is extracted from the moving image data output from the image pickup unit 101, is then encoded, and recorded on the disk D by the disk I/F 103 (a step S208).

The one frame of encoded still image data is recorded as one file on the disk D in this embodiment. Further, the system controller 104 controls the image signal processing unit 102, generates thumbnail image data in which the size of the image data to be recorded is compressed, encodes the thumbnail image data, and records the data on a predetermined location of the image file, such as a file header, footer, or the like.

Note that the trigger key 106a is a two-stroke release switch in the video camera 100 of this embodiment. The system controller 104 extracts one frame of image data in accordance with turn-on of a first stroke of the release switch, from the moving images from the image pickup unit 101, stores the one frame of image data in the memory within the image signal processing unit 102, and displays one frame of still image in the display unit 107. Operation then proceeds from the step S201 to the step S207 when a second stroke of the release switch is turned on in this state.

Further, if the first stroke of the release switch is turned off after being turned on without the second stroke of the release switch being turned on, the image data held in the internal memory is released, and the image signal processing unit 102 is controlled so as to display the image from the image pickup unit 101 once again.

In a step S208, the system controller 104 controls the management information processing unit 105 so as to add new image file information to contents management information after the image data file is recorded on the disk D.

The term "contents management information" refers to information for managing the image files recorded on the disk D, and includes an ID, a date of photography, group information described later, and the like for each image file. This contents management information is recorded on the disk D by the disk I/F 103. The contents management information is recorded on the disk D as a different file from the image file in this embodiment.

Further, in case that the re-photographing mode is set in the step S207, one frame of image data corresponding to the operation of the trigger key 106a is read out from the image signal processing unit 102, and recorded on the disk D by the disk I/F 103. Next, which of the re-photographing mode and a normal mode is the photographing mode of the immediately-preceding image is detected in a step S211.

In case that the immediately-preceding image was photographed in the normal mode, the management information processing unit 105 is controlled so that new group management information is generated and an ID of the immediately-preceding photographed image data and an ID of the newly recorded image data are registered for the group. The new image data is then defined as a representative image of this group, and the ID of the representative image data is appended to the group management information (a step S212).

The group management information thus generated and the newly photographed image data information are then appended to the contents management information, and recorded on the disk D by the disk I/F 103 (a step S213).

On the other hand, in case that the immediately-preceding photographed image data is also picked up in the re-photographing mode in the step S211, the management information processing unit 105 is controlled so that the group management information is changed so as to add an ID of the newly photographed image data to the same group as the group to which the immediately-preceding image data is registered. In addition, the newly photographed image data is newly set as the representative image of this group, and the ID of the representative image data is changed to the ID of the new image data (a step S214).

The group management information thus generated, and the newly photographed image data are then appended to the contents management data, and recorded on the disk D by the disk I/F 103 (a step S215).

Figure 4:
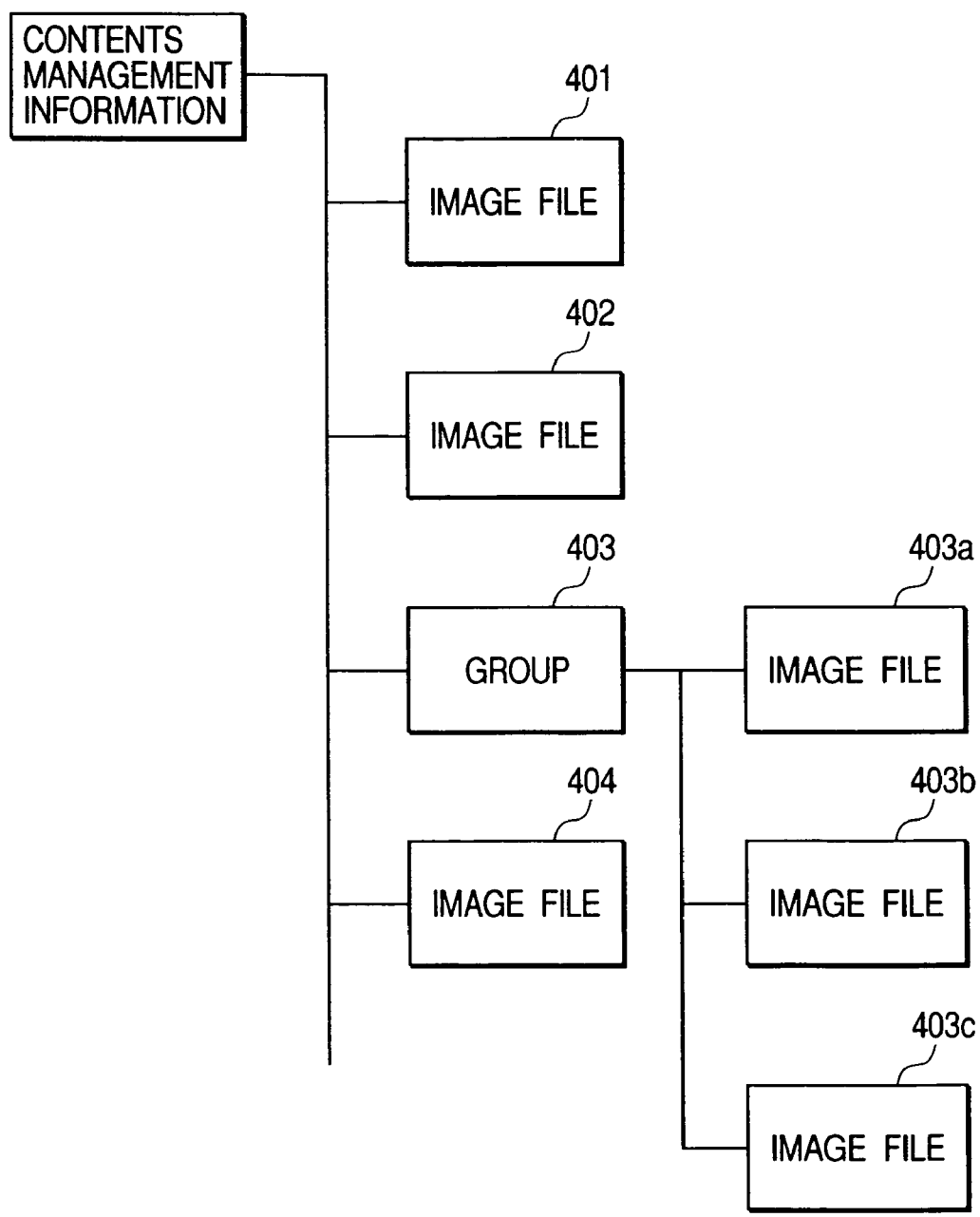
FIG. 4 is a diagram showing an image data recording state by contents management information.

FIG. 4 is a diagram showing a relationship between the image data recorded on the disk D in accordance with the contents management information.

As shown in FIG. 4, a group 403 that contains image data 403a, 403b, and 403c photographed by the re-photographing mode exists in parallel with image data 401, 402, and 404 photographed by the normal photography mode. The image data 403c, which is photographed lastly within the group 403, is defined as the representative image of the group 403 in FIG. 4. The reproduction order is then defined in accordance with the contents management information of FIG. 4 so that the image data 401, 402, 403c, and 404 are reproduced in this order during reproduction.

By thus operating the re-photographing key 106b before photographing to set the re-photographing mode, the group management information for treating the image data photographed next as the same group as the immediately-preceding photographed image data is generated and recorded on the disk D in this embodiment. There is regulated by the contents management information so that one group is treated in parallel with other image data recorded in the normal photography mode.

FIG. 5 is a diagram showing a relationship in accordance with this embodiment between user operations and image data to be recorded.

Reference numerals 501, 503, and 505 in FIG. 5 each denote a shutter operation, and image data 502, 504, and 506 are recorded by these shutter operations. If there is a re-photographing operation 507 after recording the image data 506, the system controller 104 switches the camera 100 to the re-photographing mode. A next image data 510 is recorded when a shutter operation 508 is made in this state. An image data 510 is registered at this point in a group 517 that is the same group as that of the immediately preceding recorded image data 506, and is positioned as an image existing in parallel with the image data 506 in the time sequence.

The image data thus photographed by the shutter operation 508 in the re-photographing mode is not treated as a next image 590 of the immediately-preceding image data 506 in the time sequence, and further, the image data 510 after re-photographing is defined as the representative image of the group 517 and newly set as the next image after the image 504.

Additionally, if there is a re-photographing operation 511 after photographing the image 510, the next image is also photographed in the re-photographing mode. As a result, an image data 514 photographed by a shutter operation 512 is registered in the same group 517 as that of the images 506 and 510 that were photographed immediately before the image data 514, and is positioned as an image existing in parallel with the images 506 and 510 in the time sequence.

That is, the image data photographed by the shutter operation 512 is not treated as the next image of the immediately-preceding image 510, and the image data 514 after re-photographing is newly defined as the representative image of the group 517, and newly set as the next image of the image 504.

Next, if there is a shutter operation 515 after photography of the image 514 without performing a re-photographing operation, the image data photographed by the shutter operation 515 is recorded in the normal photography mode. An image 516 is then defined as the next image of the group 517, that is, the next image data of the image data 514 which is the representative image of the group 517 here.

A time sequence order of the image data of FIG. 5 is defined in the order indicated with an arrow 518 as a result of the above-mentioned photographing.

FIG. 6 is a diagram showing a state of the contents management information in this embodiment.

IDs, recording location (address), and quantity of information for all files including the image data files recorded on the disk D, are described in contents information in FIG. 6. The recorded image data files and group photographing order IDs are described in file management information. IDs of groups recorded (set) on the disk D are described in group information. Further, the IDs of the image files registered in each group and the ID of the representative image data of the group are described in file information within the group. Two groups are set in the example of FIG. 6.

Note that the contents management information is recorded in a predetermined location of the disk D, for example, in a predetermined number of tracks of the innermost circumferential side.

Processing during reproduction is explained next.

In case that the reproduction mode is set by the mode key 106c, the system controller 104 controls the disk I/F 103 so that the contents management information is reproduced by the disk D. The contents management information reproduced by the disk I/F 103 is output to the management information processing unit 105, and stored in the internal memory. The system controller 104 controls the disk I/F 103, the image signal processing unit 102, and the display unit 107 so as to read out thumbnail image data of the image files and thumbnail image data of the group representative images, recorded on the disk D, on the basis of the contents management information, and display the data arranged in the order designated in the file management information.

FIG. 7 is a diagram showing a state of a list of thumbnails screen 700 displayed during the reproduction mode for the disk D in which image data like that of FIG. 5 is recorded.

In FIG. 7, thumbnail images 701, 702, and 704 are thumbnail images of the image data 502, 504, and 516 of FIG. 5, respectively, and a thumbnail image 703 is a thumbnail image of the image data 514, which is the representative image of the group 517. Image numbers 705 are displayed beneath each of the thumbnail images, and further, group information 706 showing that the thumbnail 703 is a group representative image and that there are two other images existing in the same group, is displayed beneath the group representative image thumbnail 703.

Through the above-mentioned display, it thus becomes possible for the user to easily recognize by merely verifying the thumbnail screen that group photographed in the re-photographing mode exists on the disk D, and the number of the image data registered in each of the groups.

If the user operates an cursor key (not shown) of the operation unit 106 while the thumbnail images are thus displayed, and operates the reproduction key after moving a cursor image 707 to a desired thumbnail image, the system controller 104 will control the disk I/F 103 and the image signal process unit 102 so that the image data file corresponding to the designated thumbnail is reproduced from the disk D and displayed instead of the list of thumbnails.

Further, in case that a group display key (not shown) is operated after moving the cursor 707 to the group representative thumbnail, the system controller 104 controls the disk I/F 103 and the image signal processing unit 102 so as to read out intra-group of the group designated by the management information processing unit 105, and read out and display as a summary the thumbnail images of all the image data registered within the same group.

FIG. 8 is a diagram showing a state of a list of thumbnails of the group screen 800.

In FIG. 8, thumbnail images 801, 802, and 803 of three image data registered in a selected group are displayed, and further, image number information 804 and group number information 805 are displayed beneath each of the thumbnail images. Further, information 806 denoting a representative image is displayed beneath the group representative image thumbnail 803.

It is possible for the user to change the representative image and to delete the image data by operating the operation unit 106 while this screen is displayed.

That is, in case that the user operates a registration key of the operation unit 106 after moving the cursor 807 when the list of groups screen of FIG. 8 is displayed, the system controller 104 then instructs the management information processing unit 105 to change the representative image of the group to the designated image. The management information processing unit 105 receives this instruction and changes the ID of the representative image data in the intra-group file information within the contents management information to the designated ID, outputs the ID to the disk I/F 103, which records it on the disk D.

Further, it becomes possible to delete a designated image from the disk D by the user's operating a deletion key of the operation unit 106 after moving the cursor image when the list screen of FIG. 7 or FIG. 8 is displayed.

The above processes are explained next by using flowcharts of FIGS. 9A and 9B.

Figure 9B:
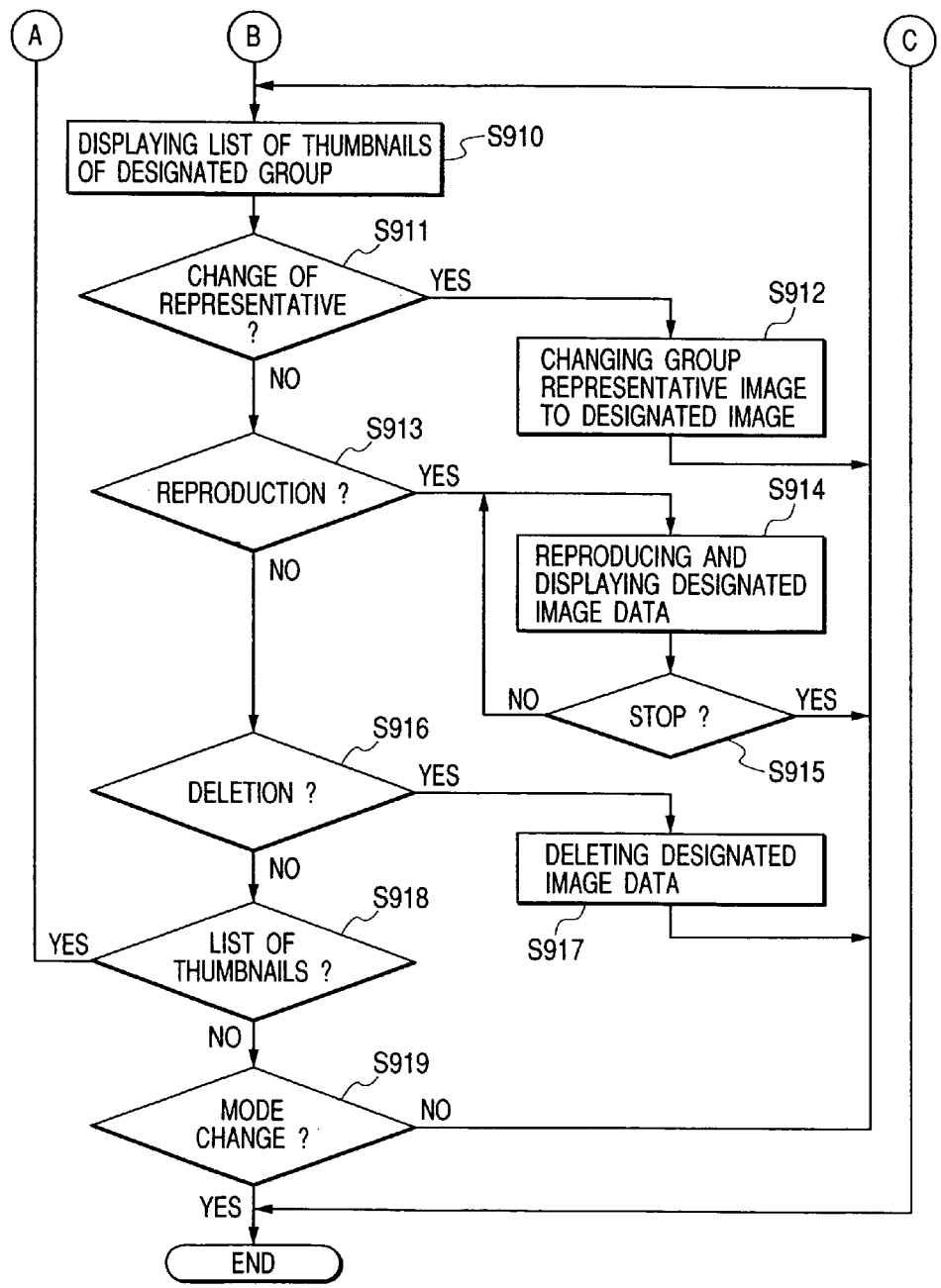
FIG. 9, composed of FIGS. 9A and 9B, is a flowchart showing operation during reproduction.

FIGS. 9A and 9B are flowcharts showing processes of the system controller 104 in the reproduction mode.

When the video camera 100 is put into the reproduction mode, the contents management information is reproduced from the disk D and output to the management information processing unit 105 (a step S901). The thumbnail image data of each image data file and the group representative image data is then reproduced from the disk D based on this contents management information, and a list screen of thumbnail images like those of FIG. 7 is displayed in the display unit 107 (a step S902).

In case that the reproduction key is operated in this state (a step S903), the image data that corresponds to the thumbnail image designated by the cursor at this point is reproduced from the disk D and displayed in the display unit 107 (a step S904). The display thereafter returns to the list screen display of the step S902 if there is a reproduction stop instruction (a step S905).

Further, in case that a deletion key is operated while the list of thumbnails screen is displayed (a step S906), the image data designated by the cursor is deleted from the disk D (a step S917). In case that the designated image data is a group representative image at this time, the management information processing unit 105 is controlled so that other image data among the image data of the same group as the group to which the designated image data is registered, for example, the image data photographed lastly within the same group, is set as the representative image of this group.

Further, in case that a group display key is operated when the list of thumbnails screen is displayed (a step S908), the thumbnail image data of the image data files registered in the designated group are reproduced from the disk D, and a list of thumbnails of the group is displayed in the display unit 107 instead of the list of thumbnails display (a step S910).

When there is provided an instruction to change the representative image while the list of thumbnails of the group is displayed (a step S911), after the management information processing unit 105 is controlled so as to change the group representative image to the designated image (a step S912), operation again returns to the step S910 and the representative screen information 806 shown in FIG. 8 is added beneath the newly designated representative image thumbnail and displayed.

Further, when the reproduction key is operated (a step S913), the designated image data is reproduced from the disk D and displayed (a step S914). In case that there is provided a reproduction stop instruction thereafter, the display returns to the list display of thumbnails of the group in the step S910 (a step S915).

Further, when the deletion key is operated while the list of thumbnails of the group screen is displayed (a step S916), the image data designated by the cursor is deleted from the disk D (the step S917). In case that the designated image data is a group representative image, the management information processing unit 105 is controlled so that other image data among the image data of the same group as the group to which the designated image data is registered, for example, the image data photographed lastly within the same group, is set as the representative image of this group.

When there is provided an instruction to display the overall list of thumbnails screen again while the list of thumbnails of the group screen is displayed, operation returns to the step S902, and the overall list of thumbnails screen is displayed (a step S918). Further, when there is provided an instruction to switch from the reproduction mode, the list of thumbnails of the group screen is deleted, ending its display (a step S919).

Further, in a step S909, if there is a mode switch instruction while the overall list of thumbnails screen is displayed, the overall list of thumbnails screen is deleted, ending its display (the step S909).

As described above, in this embodiment, a plurality of image data photographed in the re-photographing mode are all thus recorded on the disk as the same group, and therefore it is not necessary for the user to determine whether or not to leave the image data on the disk during photography, and photography can be performed in comfort.

By displaying only the designated representative image within the same group as a thumbnail image during reproduction, it then also becomes possible to easily retrieve in case that many images are photographed in the re-photographing mode.

A second embodiment of the present invention is explained next.

A plurality of image data photographed in the re-photographing mode by operating the re-photographing key are treated as one group in the above-discussed embodiment. In this embodiment, however, a group key is provided in place of the re-photographing key, and not only can simple re-photographing be accomplished, but it is also possible to classify photographed images into arbitrary groups by simple operations.

Figure 10:
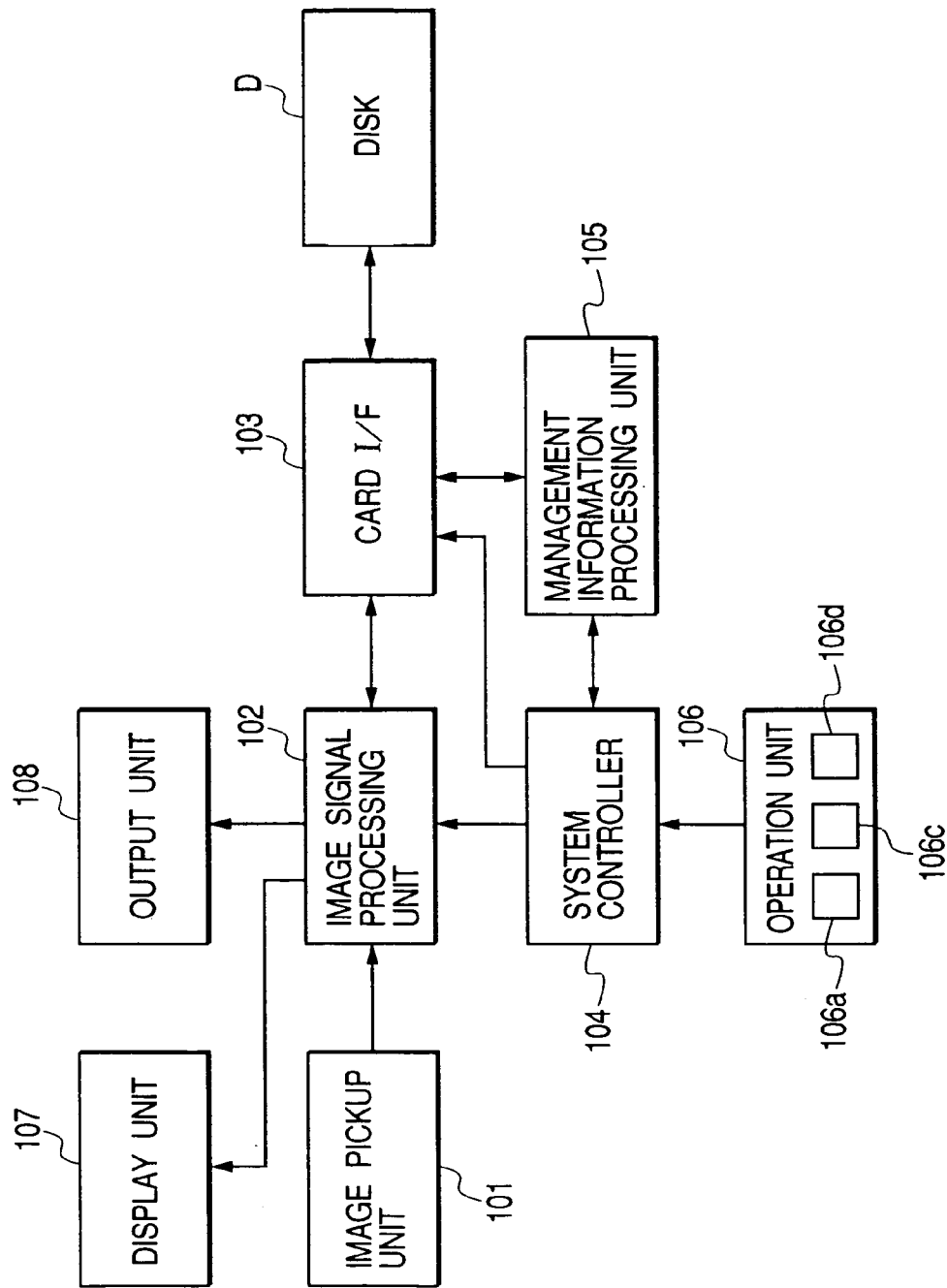
FIG. 10 is a diagram showing the structure of a video camera to which the present invention is applied.

FIG. 10 is a diagram showing the structure of the video camera 100 applied in this embodiment, and the structure is similar to that of FIG. 1, except that a group key 106d is provided in place of the re-photographing key 106b of FIG. 1.

Figure 11:
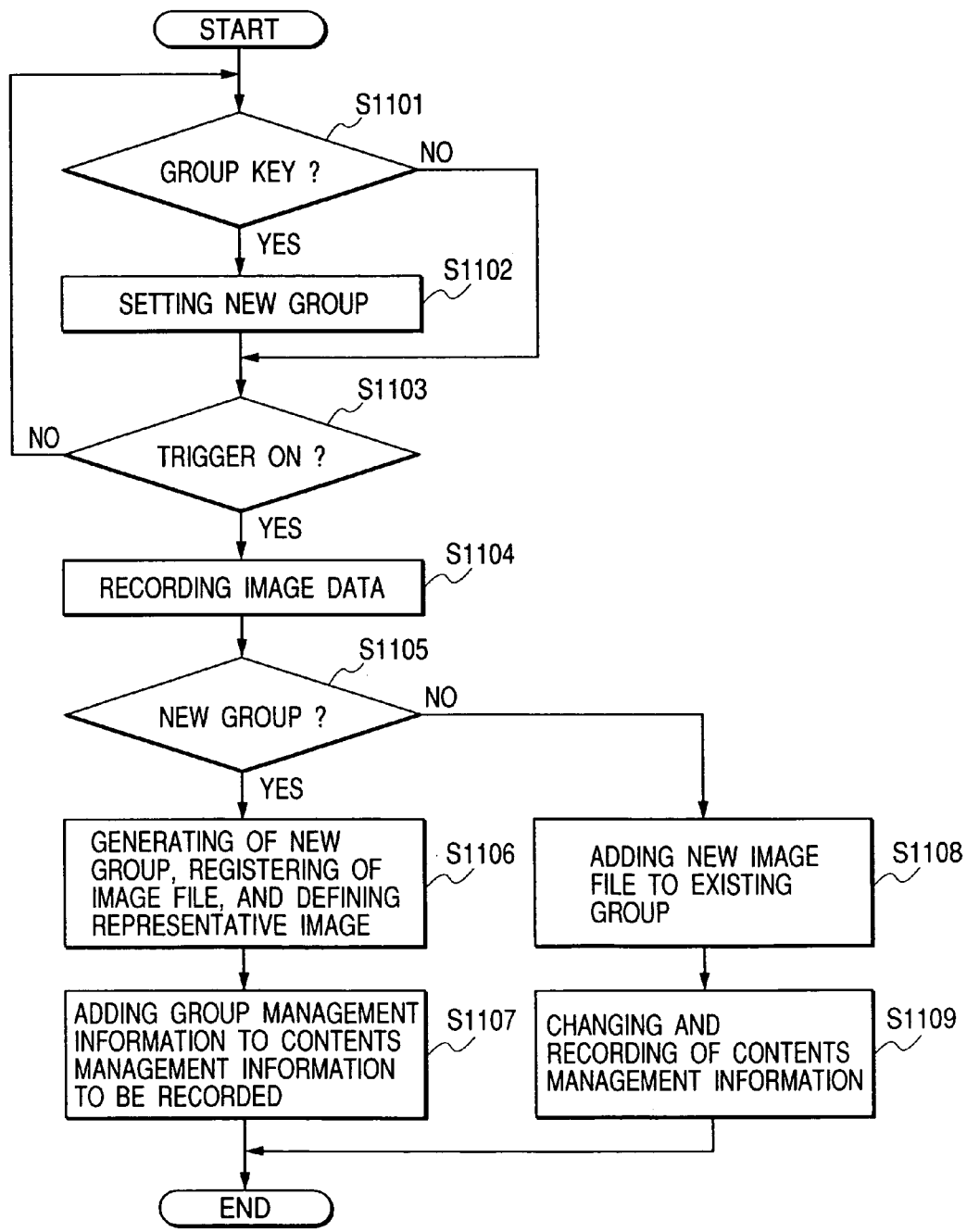
FIG. 11 is a flowchart showing operation during photography.

Operation in the video camera of FIG. 10 during photographing is explained next using FIG. 11. FIG. 11 is a flowchart showing process of the system controller 104 during photographing.

A recording pause state starts when the photographing mode is set by the mode key 106c, a moving image obtained by the image pickup unit 101 is then displayed in the display unit 107 to detect operation of the group key 106d (a step S1101). When the group key 106d is operated, a new group is set from the image to be photographed next (a step S1102). In case that there is no operation of the group key 106d in the recording pause state, the group presently set is retained as it is. Note that in this embodiment, new groups are set in the same way when the electric power is turned on.

When the recording trigger key 106a is operated (a step S1103), one frame of image data is extracted from the moving image data output from the image pickup unit 101 by the image signal processing unit 102 and then encoded. Thumbnail image data is generated by reducing a size of this one frame of image data, and the thumbnail image data is recorded on the disk D by the disk I/F 103 (a step S1104).

Whether or not a new group is set is detected next (a step S1105) to generate new group management information in case that a new group is set, and an ID of the image data now photographed is registered in this new group. Further, the newly photographed image is defined as a representative image of this group, and an ID of the representative image data is registered (a step S1106). This group management information is then added to the contents management information and recorded on the disk D (a step S1107).

On the other hand a new group is not set in the step S1106, the ID of the newly photographed image data is added to the group currently set, that is, the same group as that of the image data photographed immediately before the group currently set (a step S1108), and the contents management information is changed and recorded on the disk D (a step S1109).

Figure 12:
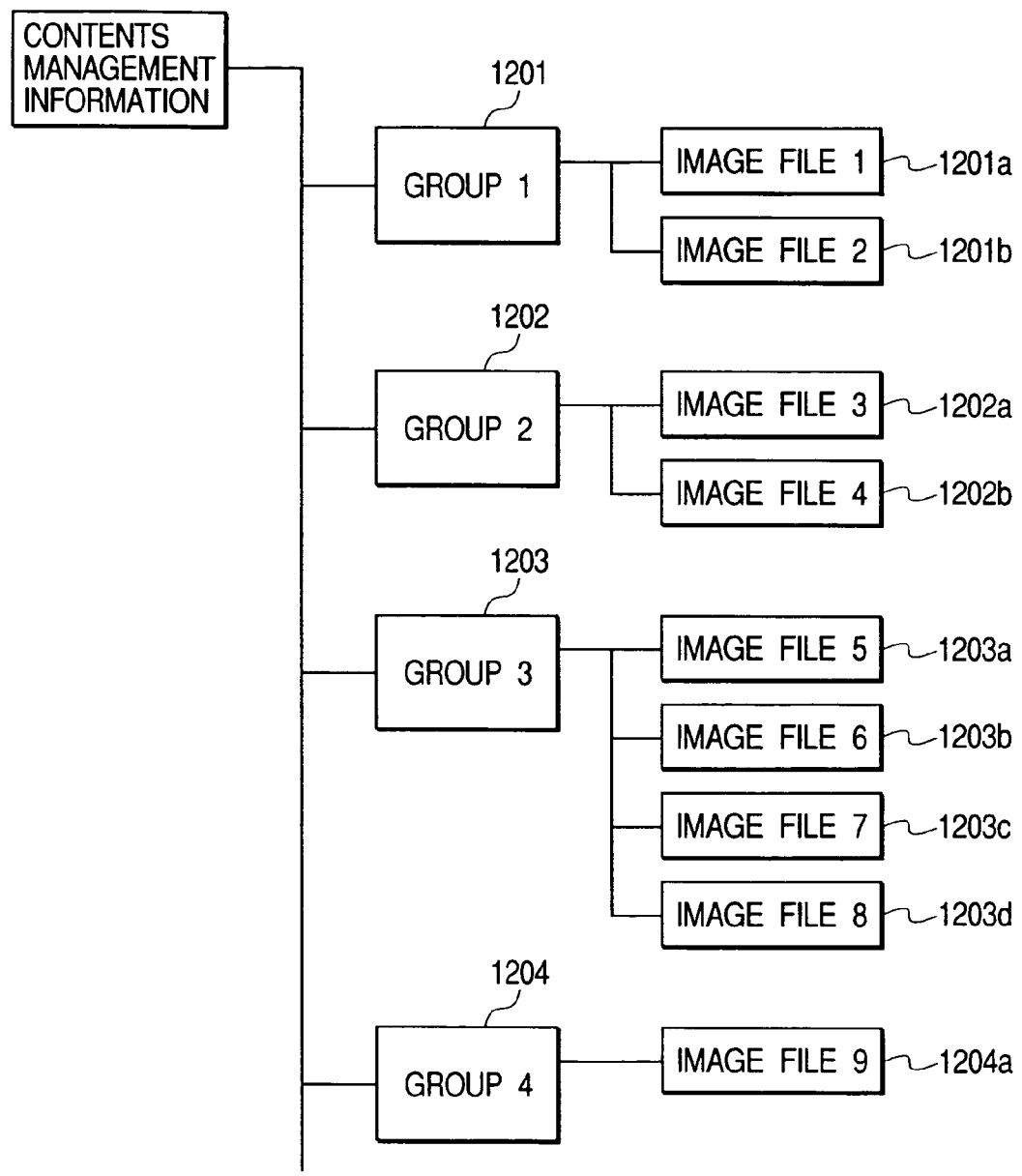
FIG. 12 is a diagram showing an image data recording state with contents management information.

FIG. 12 is a diagram showing relationships between the image data recorded on the disk D by the contents management information. In accordance with FIG. 12, groups 1201, 1202, 1203, and 1204 exist on the disk D. Two image files are registered in each of the groups 1201 and 1202, four image files are registered in the group 1203, and one image file is registered in the group 1204. Image files 1201a, 1202a, 1203a, and 1204a photographed first in their respective groups are then defined as the representative image data of their groups. In accordance with the contents management information of FIG. 12, the reproduction order is defined so that only the representative images of the groups 1201, 1202, 1203, and 1204 are reproduced in order during reproduction.

Processes of the disk D, whereon the image data are thus recorded, to be performed during reproduction are the same as those of the first embodiment mode, and only the representative image thumbnails of each group are displayed together with name information for the groups in the overall list of thumbnails screen.

Further, in case that the user selects the representative image thumbnail of a desired group and designates list of groups display, the thumbnail images of the image data of the designated group are displayed in a list, and it is therefore possible to perform a process for changing the representative image, a process for deleting the image data, and the like.

It thus becomes possible in this embodiment to treat a large number of image data to classify into groups intended by the user by simple operations in which the group key is operated before photographing, in case that the large number of image data are photographed.

Further, in this embodiment, a new group is set when the group key is operated, and therefore it is not necessary to operate the group key at the time of each photography in order to register into the same group.

Further, the images can be grouped freely by the user's intention by operating the group key, differing from automatic grouping by date of photography, location of photography, photographic mode, and the like.

Note that, although an apparatus for recording still image data is explained in the above embodiment, it is also possible to similarly apply the present invention to cases in which moving image data is recorded.

Further, although allotment to the groups is performed by operating the group key before photographing in the aforementioned embodiment, a structure in which the group key is operated after photography may also be used. In this case, a structure may also be used in which, for example, a certain image is allocated to the same group as the immediately-preceding photographed image by operating the group key during a period from after the certain image is photographed until the next image is photographed.

Further, although a case of applying the present invention to a video camera that records and reproduces image data and voice data to and from a disk medium is explained in the aforementioned embodiment modes, it is also possible to employ a recording medium that uses semiconductor memory, such as a memory card.

Further, storage medium such as ROMs, RAMs, memory cards, CD-ROMs, and the like with control programs stored therein for achieving the functions shown in FIGS. 2A, 2B, FIGS. 9A, 9B, or FIG. 11 in the aforementioned embodiment modes are also included in the present invention.

As explained above, it becomes possible to treat image data photographed in succession as the same group through simple operations in accordance with the present invention, and a large amount of image data can be managed easily.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus that captures images, comprising:
   a reproducing unit configured to reproduce, from a recording medium, a plurality of image data allocated to a group and management information of the group, the management information including identification information of the image data of the group and the identification information of the image data designated as a representative image of the group among the plurality of image data allocated to the group;

an instructing unit configured to determine one of the plurality of image data allocated to one group and instruct to delete the determined image data;

a deleting unit configured to delete the determined image data from the recording medium in accordance with an instruction of said instructing unit so that said one group no longer includes the determined image data; and a control unit configured to automatically change, in accordance with the determined image data being deleted by said deleting unit from said one group, the identification information of the image data designated as the representative image of said one group, to the identification information of one of the plurality of image data of said one group other than the determined image data if the determined image data is designated as the representative image of said one group.

2. An apparatus according to claim 1, further comprising:
a display unit configured to display a plurality of representative images of the plurality of groups on the same screen;

a selecting unit configured to select one of the plurality of representative images displayed by said display means, wherein said reproducing unit reproduces the image data of the group corresponding to the representative image selected by said selecting means.

3. An apparatus according to claim 1, wherein said control unit designates the latest image data among the plurality of image data of said one group as the representative image data of said one group and automatically changes the identification information of the image data designated as the representative image of said one group, to the identification information of the latest image data if the determined image data is designated as the representative image data of said one group.

4. An imaging apparatus that captures images, comprising:
a reproducing unit configured to reproduce, from a recording medium, a plurality of image data allocated to a group and management information of the group, the management information including identification information of the image data designated as a representative image of the group among the plurality of image data allocated to the group;

an instruction receiving unit configured to receive an instruction from a user;

a control unit configured to change, in accordance with a representative image changing instruction received from the user by the instruction receiving unit, the identification information of the image data designated as the representative image of one group, to the identification information of one image data determined by the representative image changing instruction among the plurality of image data allocated to the one group, such that the one image data determined by the representative image changing instruction among the plurality of image data allocated to the one group is designated as the representative image of the one group; and a deleting unit configured to delete determined image data from the recording medium in accordance with an image deleting instruction received from the user by the instruction receiving unit;

the control unit discriminating that the deleted image data is designated as the representative image in accordance with the image deleting instruction, and automatically changing the identification information of the image data designated as the representative image of the group in which the deleted image data is allocated, to the identification information of one of the plurality of image data other than the deleted image data in the group in which the deleted image data is allocated, such that the one of the plurality of image data other than the deleted image data in the group in which the deleted image data is allocated is designated as the representative image of the group in which the deleted image data is allocated, if it is discriminated that the deleted image data is designated as the representative image.

5. An apparatus according to claim 4, further comprising:
a display unit configured to display a plurality of representative images of the plurality of image data of one group on the same screen; and wherein the instruction receiving unit receives the image deleting instruction for determining the image data corresponding to one of the plurality of representative images displayed by said display means.

6. An apparatus according to claim 4, wherein said control unit designates the latest image data among the plurality of image data of said one of the plurality of groups as the representative image data of said one of the plurality of groups and automatically changes the identification information of the image data designated as the representative image of said one of the plurality of groups, to the identification information of the latest image data if the determined image data is designated as the representative image of said one of the plurality of groups.

7. An apparatus according to claim 4, further comprising instructing unit configured to select one group and instructs to change the representative image of the selected group, wherein said control unit changes the identification information of the image data designated as the representative image of the selected group into the identification information of other image data in the selected group in accordance with said instruction to change the representative image.

8. An apparatus according to claim 4, further comprising:
a display unit configured to display a representative image of the group and a representative image of the image data which is not allocated to any group on the same screen, wherein said reproducing unit reproduces, in accordance with a reproducing instruction for determining the representative image corresponding to image data to be reproduced from the user received by the instruction receiving unit, the image data corresponding to the determined representative image.

9. A method for controlling an imaging apparatus that captures images, comprising the steps of:
reproducing, from a recording medium, a plurality of image data allocated to a group and management information of the group, the management information including identification information of the image data of the group and the identification information of the image data designated as a representative image of the group among the plurality of image data allocated to the group;

determining one of the plurality of image data allocated to one group and instructing to delete the determined image data;

deleting the determined image data from the recording medium in accordance with an instruction by said determining and instructing step so that said one group no longer includes the determined image data; and automatically changing, in accordance with the determined image data being deleted in said deleting step from said one group, the identification information of the image data designated as the representative image of said one group, to the identification information of one of the plurality of image data of said one group other than the determined image data if the determined image data is designated as the representative image of said one group.

10. A method for controlling an imaging apparatus that captures images, comprising the steps of:
reproducing, from a recording medium, a plurality of image data allocated to a group and management information of the group, the management information including identification information of the image data designated as a representative image of the group among the plurality of image data allocated to each group;
receiving an instruction from a user;
automatically changing, in accordance with a representative image changing instruction from the user received in the instruction receiving step, the identification information of the image data designated as the representative image of one group, to the identification information of one image data determined by the representative image changing instruction among the plurality of image data allocated to the one group, such that the one image data determined by the representative image changing instruction among the plurality of image data allocated to the one group is designated as the representative image of the one group; and
deleting determined image data from the recording medium information indicates that the deleted image data is designated as the representative image.

11. An imaging apparatus that captures images, comprising:
a reproducing unit configured to reproduce, from a recording medium, a plurality of image data allocated to a group;
a processing unit configured to display, on a display device, a representative image of the group on the basis of management information of the image data recorded on the recording medium, the management information including identification information of the image data designated as the representative image among the plurality of image data allocated to the group;
an instruction receiving unit configured to receive an instruction to designate one of the plurality of image data allocated to one group and delete the designated image data;
a deleting unit configured to delete the image data from the recording medium in accordance with an instruction received by the instruction receiving unit so that said one group no longer includes the determined image data; and
a controller configured to automatically change the identification information in accordance with the determined image data being deleted by the deleting unit from said one group such that if the determined image data is designated as the representative image, the identification information of the image data designated as the representative image of said one group is changed to the identification information of one of the plurality of image data of said one group, other than the deleted image data,
wherein the controller controls the processing unit in accordance with the changed management identification information so as to display the image data of the representative image of the said one group.

12. An apparatus according to claim 11, wherein the management information includes the identification information of the plurality of image data allocated to group.

13. An apparatus according to claim 11, wherein the processing unit displays a plurality of representative images of the group with name information thereof.

14. An apparatus according to claim 11, wherein the instruction receiving unit receives an instruction to display the plurality of image data of the one group, and
wherein the controller controls the reproducing unit to reproduce the plurality of image data of the one group from the recording medium in accordance with the instruction received by the instruction receiving unit.

15. An apparatus according to claim 11, further comprising:
an image pickup unit; and
a recording unit configured to record image data obtained by the image pickup unit in the recording medium.

16. An apparatus according to claim 15, wherein the recording unit records management information on the recording medium.

17. A method for controlling an imaging apparatus that captures images, comprising the steps of:
reproducing, from a recording medium, a plurality of image data allocated to a group and a management information of the group, the management information including identification information of the image data designated as representative image of the group;
deleting the image data from the recording medium; and
automatically changing the identification information of the image data designated as the representative image of the group in which the deleted image data is allocated, to the identification information of one of the plurality of image data other than the deleted image data in the group in which the deleted image data is allocated, such that the one of the plurality of image data other than the deleted image data in the group in which the deleted image data is allocated is designated as the representative image of the group in which the deleted image data is allocated, in accordance with the image data designated as the representative image by the identification information being deleted in said deleting step.

18. A method for controlling an imaging apparatus that captures images, the method comprising the steps of:
reproducing, from a recording medium, a plurality of image data allocated to a group;
displaying, on a display device, a representative image of the plurality of image data on the basis of management information recorded on the recording medium, the management information including identification information of the image data of the group and the identification information of the representative image of the plurality of image data allocated to the group;
receiving an instruction to designate one of the plurality of image data allocated to one group and delete the designated image data;
deleting the image data from the recording medium in accordance with the instruction received in said instruction receiving step so that said one group no longer includes the determined image data; and
controlling to automatically change, in accordance with the determined image data being deleted in said deleting step from said one group, the identification information of the image data designated as the representative image of said one group, to the identification information of one of the plurality of image data of said one group, other than the determined image data if the determined image data is designated as the representative image of the one group,
wherein said controlling step includes controlling said displaying step in accordance with the changed identification information to display the image data of the representative image of the said one group.

19. A method according to claim 18, wherein the reproducing step reproduces the management information including identification information of the image data allocated to the group, and wherein the displaying step determining the image data displayed as the representative image in accordance with the identification information.

20. A method according to claim 18, wherein the displaying step displays a plurality of representative images of the group with name information thereof.

21. A method according to claim 18, wherein said instruction receiving step receives an instruction to display the plurality of image data of the one group, and
wherein the reproducing step reproduces the plurality of image data of the one group from the recording medium in accordance with the received instruction.

22. A method according to claim 18, further comprising:
a step of receiving image data obtained by an image pickup unit; and
a step of recording the image data received in the receiving step on the recording medium.

23. A method according to claim 22, wherein the recording step records management information on the recording medium.

24. A computer-readable storing medium storing a computer-readable program comprising a program code for causing a computer to execute the method according to any one of claims 18, 19, 20, 21, 22, and 23.

* * * * *